United States Patent
O'Neill (10) Patent No.: US 10,065,569 B2
(45) Date of Patent: Sep. 4, 2018

(54) VEHICLE CENTRE CONSOLES

(71) Applicant: FORD GLOBAL TECHNOLOGIES, LLC, Dearborn, MI (US)

(72) Inventor: Jonathan Terence Joseph O'Neill, Erith (GB)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/266,667

(22) Filed: Sep. 15, 2016

(65) Prior Publication Data

US 2017/0096111 A1 Apr. 6, 2017

(30) Foreign Application Priority Data

Oct. 5, 2015 (GB) .................................. 1517521.9

(51) Int. Cl.
*B60R 11/00* (2006.01)

(52) U.S. Cl.
CPC ....... *B60R 11/00* (2013.01); *B60R 2011/0007* (2013.01); *B60R 2011/0094* (2013.01)

(58) Field of Classification Search
CPC .............. B60R 7/04; B60R 2011/0007; B60R 2011/0057; B60R 13/0262; B60R 2011/0094; B60N 2/4626; B60N 2/466; B60N 2/4673; B60N 2/468; B60N 2/4686
USPC ................ 296/24.34, 1.08; 297/115, 411.21, 297/411.35
See application file for complete search history.

(56) References Cited

U.S. PATENT DOCUMENTS

| | | | |
|---|---|---|---|
| 2,642,922 A | 6/1953 | Monroe et al. | |
| 5,403,066 A | 4/1995 | Drum | |
| 5,562,331 A | 10/1996 | Spykerman et al. | |
| 5,690,384 A | 11/1997 | Rossi | |
| 5,749,629 A | 5/1998 | Heath et al. | |
| 6,158,793 A * | 12/2000 | Castro ..................... | B60R 11/02 224/548 |
| 6,494,527 B1 * | 12/2002 | Bischoff ............ | B60H 1/00985 296/208 |
| 6,644,705 B2 | 11/2003 | Wikman et al. | |
| 6,676,209 B1 | 1/2004 | Szabo et al. | |
| 6,746,065 B1 * | 6/2004 | Chan ..................... | B60N 2/468 296/24.34 |
| 6,746,067 B2 * | 6/2004 | Schmidt ................ | B60K 37/06 180/326 |

(Continued)

FOREIGN PATENT DOCUMENTS

| CN | 204020739 U | 12/2014 |
|---|---|---|
| DE | 19611913 C1 | 7/1997 |

(Continued)

OTHER PUBLICATIONS

English Machine Translation of FR2961763A1.

(Continued)

*Primary Examiner* — Gregory A Blankenship
(74) *Attorney, Agent, or Firm* — Vichit Chea; King & Schickli, PLLC (57) ABSTRACT

A reversible pad is provided for use on a vehicle center console. The pad includes a first side provided with a utility surface, a second side provided with a luxury surface, and wherein the pad is configured to engage with a center console with either the first side or the second side uppermost.

7 Claims, 8 Drawing Sheets

(56) References Cited

U.S. PATENT DOCUMENTS

| | | | |
|---|---|---|---|
| 7,011,273 B1 * | 3/2006 | Stanford | B60N 3/102 224/275 |
| 7,111,883 B1 * | 9/2006 | Patel | B60R 7/04 296/24.34 |
| 7,114,755 B1 * | 10/2006 | Sturt | B60N 3/102 296/24.34 |
| 8,668,258 B2 * | 3/2014 | Uwague-Igharo | B60N 2/4686 224/275 |
| 2002/0163215 A1 * | 11/2002 | Emerling | B60P 3/40 296/3 |
| 2006/0208517 A1 * | 9/2006 | Nakamura | B60R 7/04 296/37.1 |
| 2009/0174206 A1 * | 7/2009 | Vander Sluis | B60R 7/04 296/24.34 |
| 2010/0090491 A1 * | 4/2010 | Hipshier | B60R 7/04 296/24.34 |
| 2011/0140472 A1 * | 6/2011 | Vander Sluis | B60R 7/04 296/24.34 |
| 2015/0115639 A1 * | 4/2015 | Sidhu | B60R 7/04 296/24.34 |
| 2015/0375685 A1 * | 12/2015 | Krishnan | B60N 3/103 296/24.34 |
| 2017/0096111 A1 * | 4/2017 | O'Neill | B60R 11/00 |

FOREIGN PATENT DOCUMENTS

| | | | |
|---|---|---|---|
| DE | 102010048643 | A1 | 6/2011 |
| EP | 1852301 | A2 | 11/2007 |
| FR | 2877617 | A1 | 5/2006 |
| FR | 2920719 | A1 | 3/2009 |
| FR | 2959185 | A1 | 10/2011 |
| FR | 2961763 | A1 | 12/2011 |
| JP | 8253079 | A | 10/1996 |
| JP | H092161 | A | 1/1997 |
| JP | 2007290579 | A | 11/2007 |
| JP | 4063739 | B2 | 3/2008 |
| WO | WO2013127323 | A1 | 9/2013 |
| WO | 2015028117 | A1 | 3/2015 |

OTHER PUBLICATIONS

English Machine Translation of JP2007290579A.
English Machine Translation of JP4063739B2.
English Machine Translation of JP8253079.
English Machine Translation of WO2015028117A1.
"Universal Car Centre Console Black Arm Rest Includes Coin Holder and Drink Holder"; Ebay; http://www.ebay.co.uk/itm/Universal-Car-Centre-Console-Black-ArmRest-Includes-Coinholder-and-Drink-Holder-/270707412184; p. 1 of 1.
"Honda Civic Nov. 2006 Armrest Cover"; Redline Goods; http://www.amazon.co.uk/Honda-2006-11-armrest-SHIPPING-RedlineGoods/dp/B00ISF3Y0C/ref=s_1_19?s=automotive&ie=UTF8&qid=1433514468&sr=1-19&keywords=cover; p. 1 of 1.
English Machine Translation of DE19611913C1.
English Machine Translation of FR2959185A1.
English Machine Translation of JPH092161A.
English Machine Translation of DE102010048643A1.
English Machine Translation of FR2877617A1.
English Machine Translation of FR2920719A1.
English Machine Translation of CN204020739U.
English Machine Translation of EP1852301A2.

\* cited by examiner

VEHICLE CENTRE CONSOLES

TECHNICAL FIELD

This invention relates to improvements in or relating to vehicle centre consoles and, in particular, to improvements relevant to vehicles used for carrying cargo.

BACKGROUND

Most vehicles are provided with a centre console which is frequently provided with some storage, typically with a hinged lid to access the contents.

When smaller vehicles are used for carrying cargo it is not unusual for long pieces of cargo to protrude through the centre of the vehicle between the driver and passenger's seats. These pieces of cargo are typically then rested on the centre console.

If the cargo is wet or dirty, it can damage the interior of the vehicle. In order to avoid damage, it is known to spread a tarpaulin or similar cover over the areas in contact with the cargo. However, it can be difficult to draw the covers through between the seats to protect the cargo and seats without the cover interfering with the gear lever and hand brake.

It is against this background that the present invention reversible pad and centre console have arisen.

SUMMARY

Accordingly, there is provided a reversible pad for a vehicle centre console. The pad comprises a first side provided with a utility surface, a second side provided with a luxury surface. The pad is configured to engage with a centre console with either the first side or the second side uppermost.

By providing a single pad that has a utility surface and a luxury surface, the pad can be reversed and put back in the same place providing a centre console that has the same configuration and functionality in all regards except the finish on the top surface, provided by the pad. This provides a notable advantage over systems which provide a removable luxury pad to be placed over the top of the existing centre console. Such a double layering can cause difficulties with accessibility to centre console storage and also the removable pad has to be placed somewhere else when not in use making it more likely to be lost or dirtied. The new and improved reversible pad and centre console address both of these problems.

The utility surface may include a waterproof fabric, a scratch resistant surface, a durable or wear resistant fabric or a surface combining more than one of these characteristics.

The luxury surface may include a leather surface, a suede surface or a soft or plush fabric surface.

The pad may engage with the centre console either via a lip provided on one or both sides or via one or more magnets.

The pad may further comprise a hinge mechanism that enables the pad to be transitioned between a configuration in which the first side is uppermost and a configuration in which the second side is uppermost. The hinge mechanism may comprise at least one arm to interface with the pad and at least one arm to interface with the centre console, a cross bar linking the two arms and an internal pin configured to enable the pad to be rotated by 180°. The arm to interface with the pad and the cross bar may be provided in a recessed position within the pad. The hinge mechanism may be provided with two substantially parallel arms to interface with the pad.

A pad may be incorporated into a centre console which may further comprise a storage box. The pad may provide a lid for the storage box.

Furthermore, there is provided a centre console for a vehicle, the centre console comprising a plurality of independently operable telescopic legs configured to provide continuous variation within a pre-defined range for the height of each part of the centre console. The telescopic legs can be configured to provide a tilted surface.

Furthermore, there is provided a centre console for a vehicle, the centre console comprising a plurality of hinged fins configured to fold out to protect adjacent seats. The fins may be further configured to secure a load placed thereon.

BRIEF DESCRIPTION OF THE DRAWING FIGURES

The reversible pad and centre console will now be further and more particularly described, by way of example only, and with reference to the accompanying drawings, in which.

DETAILED DESCRIPTION

Figure 1:
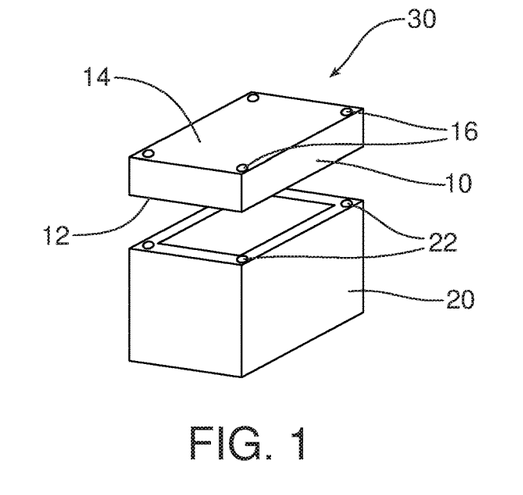
FIG. 1 shows an example of the reversible pad.

FIG. 1 shows a pad 10 which is configured for use as a lid for a storage box 20 provided as a centre console 30. In this example, the pad 10 is substantially rectilinear and has a durable or utility surface 12 and a luxury surface 14. The utility 12 and luxury 14 surfaces are provided on opposing sides of the pad 10 so that the pad 10 can be removed from the centre console 30, flipped over and replaced with the other side facing upwards.

In order to retain the pad 10 in place on the storage box 20, there are provided a set of four magnets 16, one in the vicinity of each corner of the pad 10. The storage box 20 is also provided with four magnets 22 and these are positioned such that when the pad 10 is correctly aligned, the magnets will meet and the pad 10 will be retained in position.

The four magnets 16 provided in the pad 10 and the four magnets provided in the storage box 20 may be visible, as illustrated in FIG. 1. Alternatively, they may be provided below the surface so that they are not visible.

Figure 2:
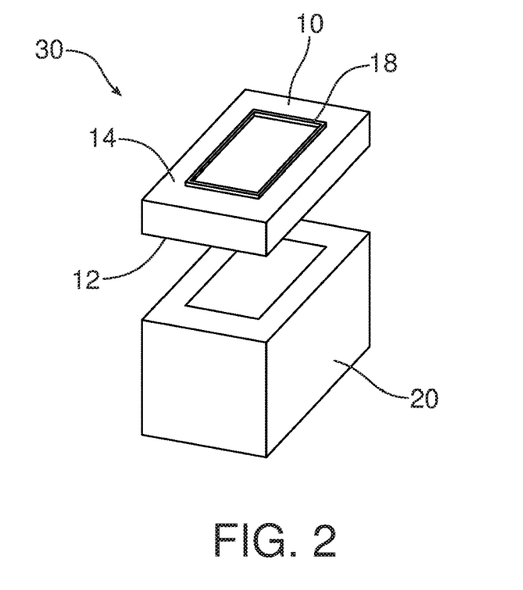
FIG. 2 shows a further example of the pad.

FIG. 2 also shows a pad 10 which is configured for use as a lid for a storage box 20 provided as a centre console. In this example, the pad 10 is provided with a lip 18 which is raised above the level of the surface of the pad. The storage box 20 is provided with an opening area 24 which is sized to mate with the lip 18 of the pad, thus securing the pad 10 in place on top of the storage box 20.

FIGS. 3A-3H show the various aspects of a hinge mechanism 40 that can be deployed in conjunction with either of the pads 10 illustrated in FIGS. 1 and 2. The hinge mechanism 40 includes an arm 42 which interfaces with the pad 10 and an arm 44 which interfaces with the centre console 30.

Between these two arms 42, 44, there is provided a cross bar 46. The cross bar 46 houses an internal pin 48. The interface between arm 42 and the pad 10 is effected with a blanking plate 41.

Figure 3A:
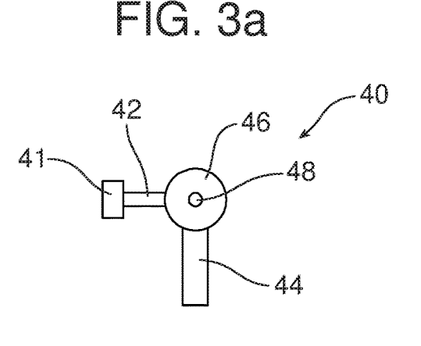
FIGS. 3A-3I show details of one example of a hinge mechanism for use in the reversible pad.

A side view of the hinge mechanism 40 is shown in FIG. 3A which shows the hinge mechanism 40 in the configuration that is adopted when the pad 10 is in contact with the centre console 30. There is approximately a right angle between the arms 42, 44.

Figure 3B:
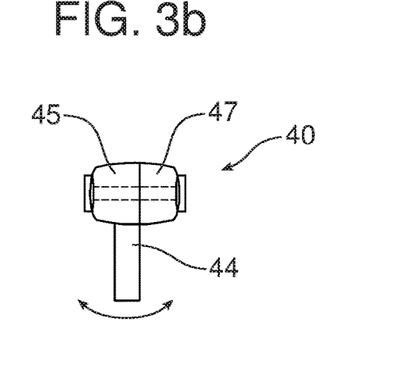

A front view of the hinge mechanism 40 is shown in FIG. 3B. The cross bar 46 includes a fixed side 45 and a pivot side 47 with the routing of the internal pin 48 shown in dashed line.

Figure 3C:
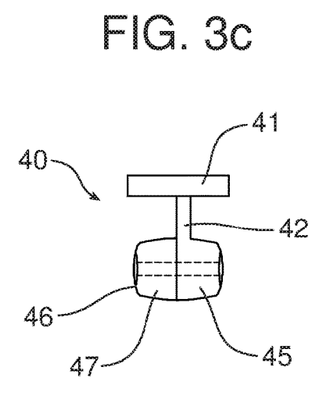

An elevated view of the hinge mechanism 40 is shown in FIG. 3C. This shows the fixed side 45 and pivot side 47 of the cross bar 46 together with the arm 42 for interfacing with the pad 10 together with the blanking plate 41.

Figure 3D:
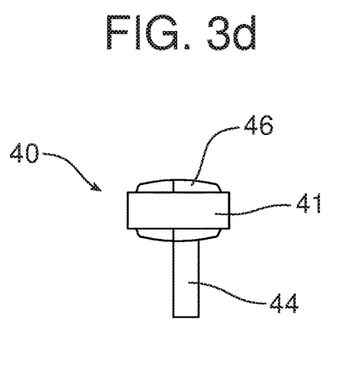

A rear view of the hinge mechanism 40 is shown in FIG. 3D. This shows the blanking plate 41 with the cross bar 46 extending away from it and the arm 44 for interfacing with the centre console extending below the blanking plate 41.

Figure 3E:
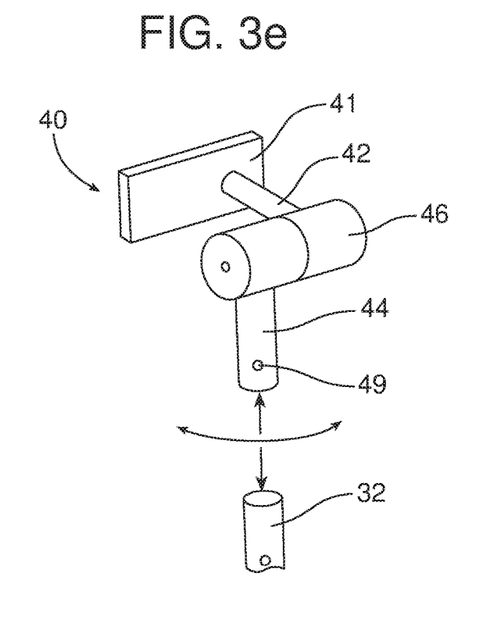

FIG. 3E shows a part perspective view of the hinge mechanism 40. FIG. 3E shows a spring ball valve 49 that is provided on the arm 44 for interfacing with the centre console 30 in order to achieve that interface. The centre console 30 is provided with a receiver 32 for the spring ball valve 49. The spring ball valve 49 optimises the position of the pad 10 in its "home" or "resting" position. In an alternative embodiment, not separately illustrated, the spring ball valve 49 and receiver 32 may be omitted.

Figure 3F:
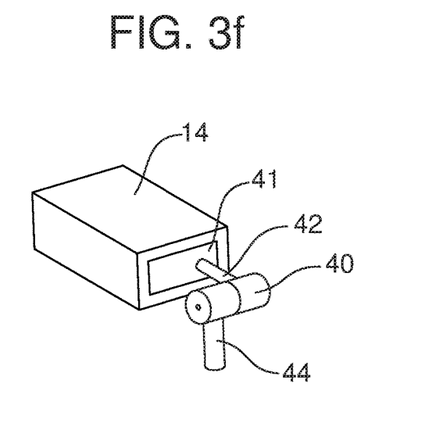
Figure 3G:
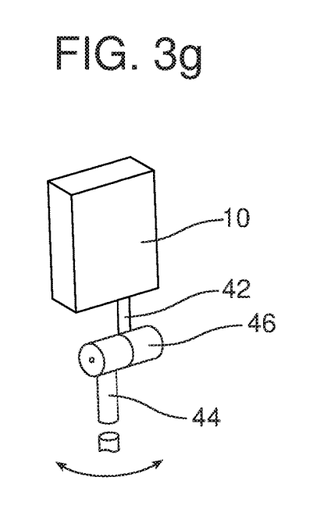
Figure 3H:
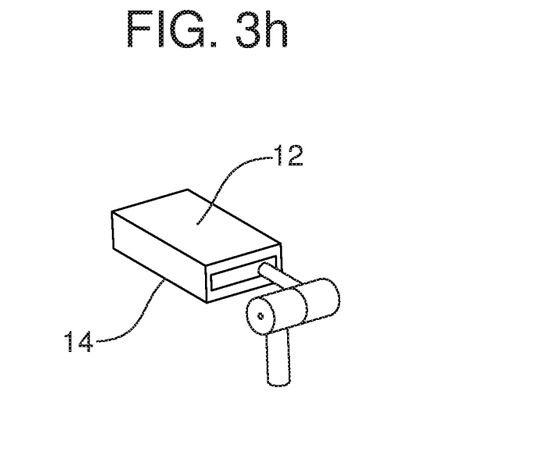

The series of images FIGS. 3F, 3G and 3H illustrate the movements undertaken by the operative to change the pad 10 from the luxury side 14 to the utility side 12. In FIG. 3F the luxury side 14 is uppermost. In order to change the configuration so that the utility side 12 is uppermost, the pad 10 is first lifted into an upright position as illustrated in FIG. 3G and the pad 10 is then rotated in the horizontal direction by 180°. The durable or utility side 12 is then uppermost and the pad 10 can be closed down onto the centre console again as shown in FIG. 3H.

Figure 3I:
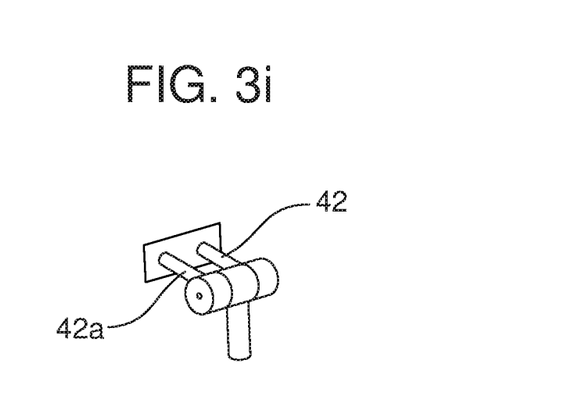

FIG. 3I shows an alternative configuration in which further lateral stability is provided in the form of a second arm 42A to interface with the pad 10.

Although the examples shown in FIG. 3 all have the entire hinge mechanism 40 exposed, in alternative embodiments, not illustrated, the arm 42 for interfacing with the pad 10 and the cross bar 46 could be recessed into the pad itself and therefore not visible to the user.

Figure 4A:
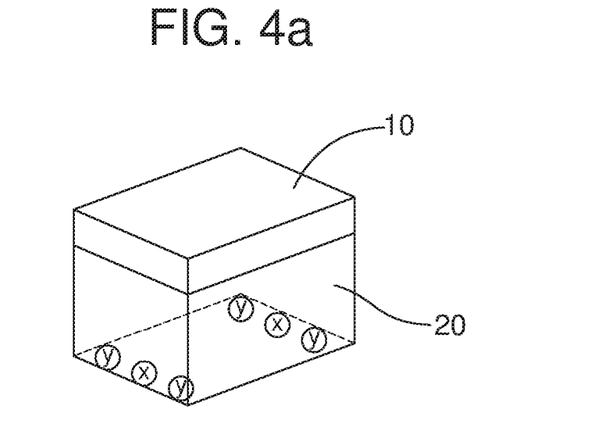
FIGS. 4A and 4B show an example of telescopic supports.
Figure 4B:
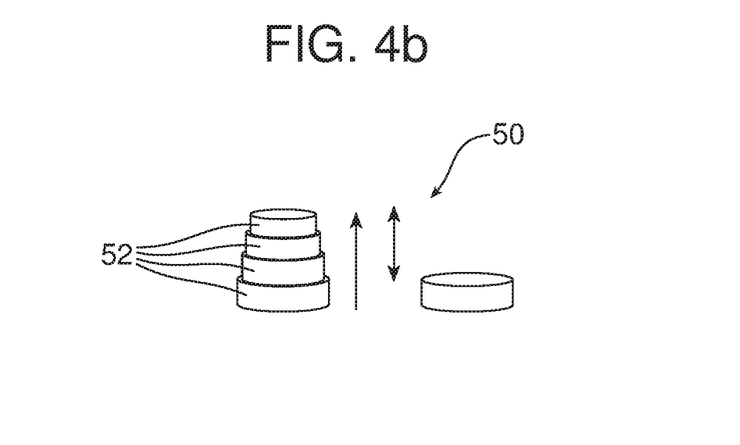

FIGS. 4A and 4B show the positions in which telescopic supports 50 can be provided, and the detail of an example of the support, respectively. FIG. 4A shows a storage box 20 closed by a pad 10. The points marked X and Y illustrate the positions of the telescopic supports 50. If the points marked X are used this configuration has two telescopic supports 50, whereas if the points marked Y are used this configuration has four telescopic supports 50.

FIG. 4B shows, schematically, a single simple telescopic support 50. This particular example has four telescopic hoops 52 which fit concentrically when the support is at its lowest level. When the telescopic support 50 is required to increase the height of the upper surface of the pad, one or more of the four telescopic hoops 52 to drawn out to increase the overall height of the support. The telescopic support 50 can be locked in place in any position between the lowest, when all four hoops 52 are concentrically stowed, up to the maximum height when all four hoops 52 are fully drawn apart. Although this example shows four hoops 52, more or fewer hoops can be used depending on the total maximum height required and the available space at minimum height.

FIGS. 5A-5D and FIGS. 6A-6D show four different configurations achieved in each of two different examples of the fitting of the telescopic supports 50. In FIGS. 5A-5D, the supports 50 are located below the storage box 20. In FIGS. 6A-6D, the supports 50 are located between the storage box 20 and the pad 10.

Figure 5A:
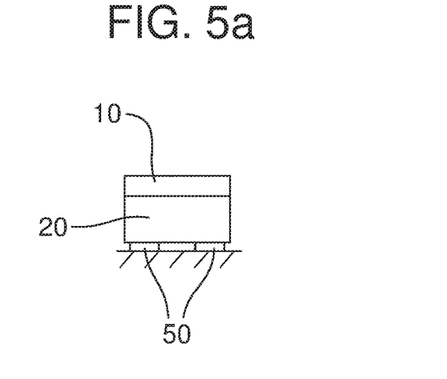
FIGS. 5A to 5D show four configurations of one example of the telescopic supports.
Figure 6A:
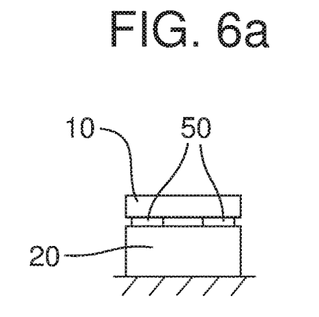
FIGS. 6A to 6D show four configurations of a further example of the telescopic supports.

FIGS. 5A and 6A show the respective centre consoles 30 with the supports 50 fully collapsed. This provides the lowest height of the pad 10 and occurs when all of the hoops in each telescopic support 50 are concentrically stacked.

Figure 5B:
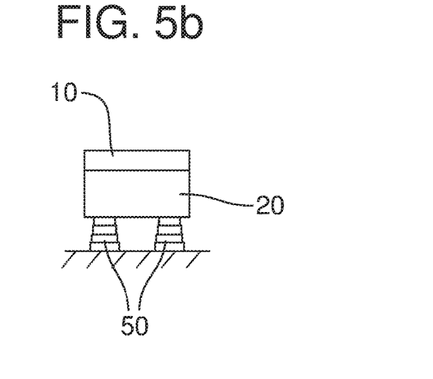
Figure 5C:
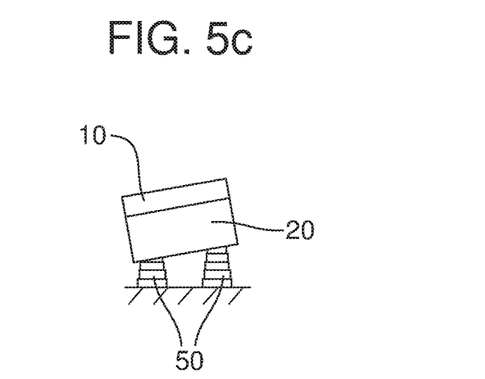
Figure 5D:
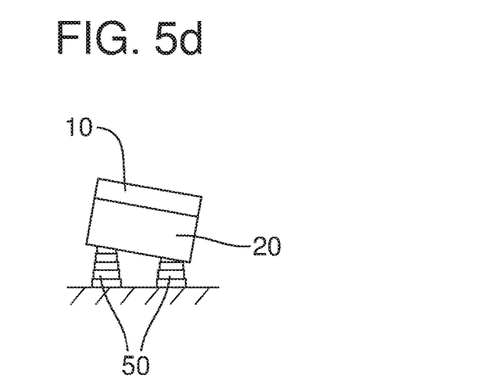
Figure 6B:
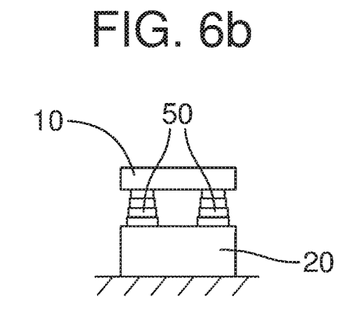
Figure 6C:
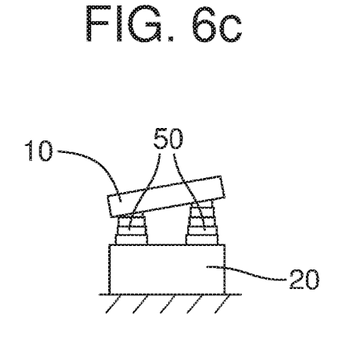
Figure 6D:
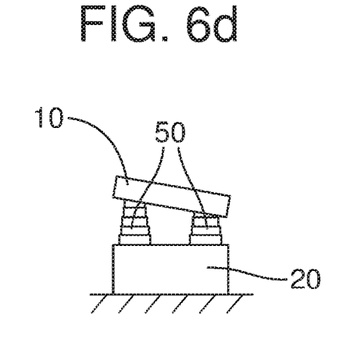

FIGS. 5B and 6B show the respective centre consoles 30 with the supports 50 fully extended so that the maximum height of the pad 10 is provided.

FIGS. 5C-5D and 6C-6D show different tilt configurations. In order to provide a tilted surface of the pad 10 to support irregular shaped or delicate loads, two adjacent telescopic supports 50 are extended to a different height from the remaining two supports. The higher supports 50 may be provided to one side, for example, the driver's side of the vehicle or, alternatively, the higher supports may be provided in fore/aft direction. This later configuration is especially convenient where there is a requirement to arrest a load that may move in transit.

Figure 7A:
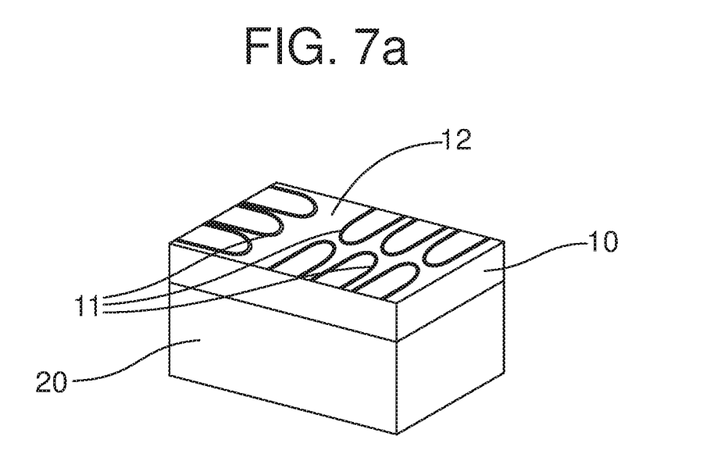
FIGS. 7A and 7B show a further example of a reversible pad with fins attached by hinges.
Figure 7B:
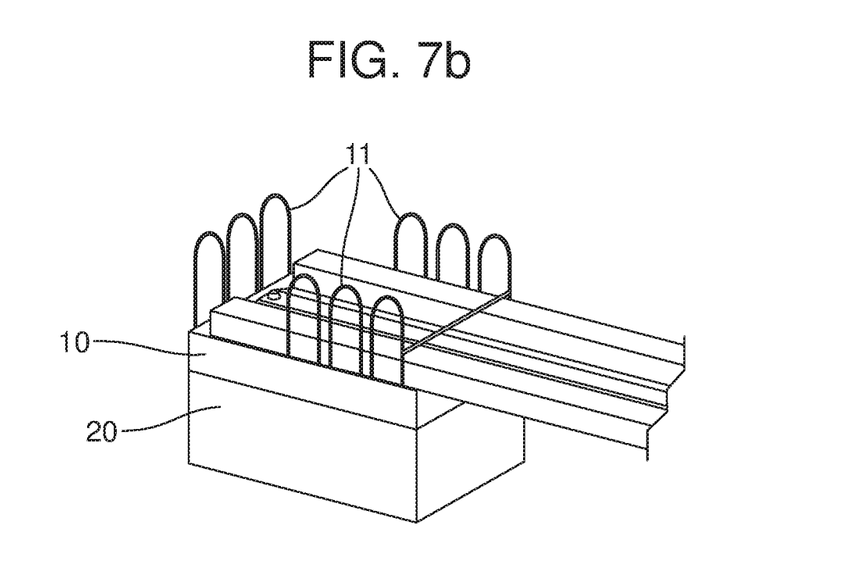

FIGS. 7A and 7B show a pad 10 which is further provided with a series of fins 11 that are provided on the durable side 12. The fins 11 are hingeably attached to the pad and can be folded out when the durable side of the pad 10 is uppermost. The fins 11 are shown in their stowed position flush with the surface of the pad 10 in FIG. 7A. FIG. 7B shows the configuration of the fins when they have been deployed. Some of the fins 11 fold out to positions adjacent to the driver and passenger seats and these fins 11 protect the fabric of the seat from the load. The fins 11 at the front of the pad 10 can be used to secure a load to prevent its ingress too far forward. Although FIGS. 7A and 7B show all of the fins in the same condition: either stowed or deployed, the fins can be individually deployed and therefore the use of some of the fins without others is also contemplated.

In a further embodiment, not shown in the accompanying drawings, the functionality of the fins 11 can be provided by a plurality of guard rails which slide up from the storage box to protect the seat sides in a similar manner to the fins 11. However, there would be no requirement to provide hinges as the guard rails would slide up and lock in place. The guard rails can be moved independently of one another and can be locked at differing heights as required in order to protect the load to be carried. The guard rails can be locked in place using a twist to lock mechanism which would allow the guard rail to be locked at any height, or, alternatively, the guard rail may be provided with a series of receivers for a spring ball valve so that the guard rail can be locked off in one of a plurality of discrete positions.

It will further be appreciated by those skilled in the art that although the invention has been described by way of example with reference to several embodiments it is not limited to the disclosed embodiments and that alternative embodiments could be constructed without departing from the scope of the invention as defined in the appended claims.

The invention claimed is:

1. A reversible pad for a vehicle centre console, the reversible pad comprising:
   a first side provided with a utility surface, wherein the utility surface is selected from a first group consisting of at least one of a waterproof fabric, a scratch resistant surface, and a wear resistant fabric;
   a second side provided with a luxury surface, wherein the luxury surface is selected from a second group consisting of at least one of a leather surface, a suede surface and a soft fabric surface; and a hinge mechanism that enables the reversible pad to be transitioned between the first side being uppermost and the second side being uppermost, wherein the hinge mechanism comprises at least a first arm to interface with the reversible pad and at least a second arm to interface with the centre console, a cross bar linking the first arm and the second arm and an internal pin configured to enable the reversible pad to be rotated by 180°, wherein the reversible pad is configured to engage with a centre console with either the first side or the second side uppermost.

2. The reversible pad according to claim 1, wherein at least one side is provided with a lip to engage with the centre console.

3. The reversible pad according to claim 1, wherein at least one side is provided with one or more magnets to engage with the centre console.

4. The reversible pad according to claim 1, wherein the first arm to interface with the reversible pad and the cross bar is provided in a recessed position within the reversible pad.

5. The reversible pad according to claim 1, wherein the hinge mechanism is provided with two substantially parallel arms to interface with the reversible pad.

6. A centre console for a vehicle, the centre console comprising a reversible pad according to claim 1.

7. The centre console according to claim 6, further comprising a storage box and wherein the reversible pad provides a lid for the storage box.

* * * * *